Figure 1:
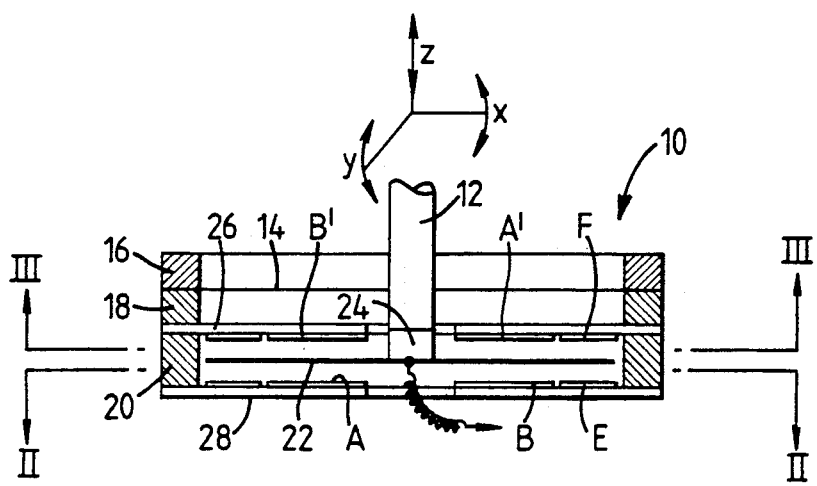

United States Patent [19]

Thomas

[11] Patent Number: 5,006,952
[45] Date of Patent: Apr. 9, 1991

[54] CAPACITIVE TRANSDUCERS

[75] Inventor: David K. Thomas, Dursley, United Kingdom

[73] Assignee: Renishaw plc, Gloucestershire, United Kingdom

[21] Appl. No.: 435,476

[22] PCT Filed: Apr. 12, 1989

[86] PCT No.: PCT/GB89/00389
§ 371 Date: Nov. 29, 1989
§ 102(e) Date: Nov. 29, 1989

[87] PCT Pub. No.: WO89/09927
PCT Pub. Date: Oct. 19, 1989

[30] Foreign Application Priority Data

Apr. 12, 1988 [GB] United Kingdom ............... 8808614

[51] Int. Cl.$^5$ ............... G01L 9/12; H01G 7/00
[52] U.S. Cl. .................. 361/283; 73/718; 307/116
[58] Field of Search ......... 361/283; 73/718, 724, 73/651; 307/116; 33/322

[56] References Cited

U.S. PATENT DOCUMENTS

| | | | |
|---|---|---|---|
| 3,857,092 | 12/1974 | Meyer | 324/61 R |
| 3,965,746 | 6/1976 | Rabek | 73/718 |
| 4,098,000 | 7/1978 | Egger | 33/348 D |
| 4,187,459 | 2/1980 | Wolfendale | 324/60 C |
| 4,629,957 | 12/1986 | Walters et al. | 73/651 X |
| 4,719,538 | 1/1988 | Cox | 361/283 |
| 4,806,783 | 2/1989 | Anderson | 361/283 X |

FOREIGN PATENT DOCUMENTS

| | | |
|---|---|---|
| 0239337 | 9/1987 | European Pat. Off. |
| 1366284 | 9/1974 | United Kingdom. |
| 2155644 | 9/1985 | United Kingdom. |
| 2036982 | 12/1982 | United Kingdom. |

OTHER PUBLICATIONS

IBM Technical Disclosure Bulletin vol. 25 No. 3B: Aug. 1982.

Primary Examiner—Donald A. Griffin
Attorney, Agent, or Firm—Oliff & Berridge

[57] ABSTRACT

A signal conditioning circuit for multiple channel capacitive displacement transducers. The transducer 30 comprises three differential capacitive transducers, driven by respective square waves from modulators 32x, 32y, 32z. The modulators are driven at different frequencies which are even multiples of each other, derived from a divider 68. The signals from each differential capacitance pair of the transducer 30 are received by a common charge amplifier 48. They are then demodulated by respective phase sensitive rectifiers 50x, 50y, 50z, each of which is driven at the same frequency as the corresponding modulator. The outputs of the phase sensitive rectifiers are integrated, e.g. by circuits 60,62,44 for one of the channels, and the resulting voltage signal is fed back to the corresponding modulator so as to tend to null the input to the charge amplifier 48. The use of modulating frequencies which are even multiples of each other enables the signals to be multiplexed through a single charge amplifier 48. The mechanical construction of the multi-channel transducer 30 is also described.

12 Claims, 6 Drawing Sheets

CAPACITIVE TRANSDUCERS

This invention relates to capacitive transducers, for example for use in displacement-responsive devices.

Capacitive displacement transducers are known for use in displacement-responsive devices such as measurement probes and joysticks, where a stylus or lever is movable in the directions of two or more orthogonal axes. Normally there would be one or more separate capacitive transducers for each axis of movement. Each such transducer comprises at least a pair of capacitor plates which are relatively movable. In some known devices, e.g. as shown in EP No. 0239337 A, there are three or more capacitor plates in each transducer, so that the transducer comprises a differential pair of capacitors. Such an arrangement has improved performance.

In conventional displacement-responsive devices with capacitive transducers, the transducer associated with each axis has a separate signal processing circuit which determines the capacitance of the transducer as the same varies with displacement. Such a signal processing circuit is known from British Patent No. GB 1 366 284, in which phase and antiphase AC input signals are applied to a differential capacitive transducer, and subsequently demodulated synchronously by a phase sensitive rectifier, and then integrated. The resulting DC signal is used to control the differential AC inputs to the transducer so as to produce a null output from the transducer, and the size of the DC control signal required to do this provides an output proportional to displacement. British Patent No. GB 2 036 982 B describes similar circuits, and additionally suggests that differential transducers in three channels may be multiplexed together in a time-sharing arrangement, so that the demodulation and control circuitry may be shared between the three channels. However, such a time-sharing arrangement does not provide a continuous output for each channel.

A first aspect of the present invention provides a circuit for providing outputs from at least two capacitive transducers, the circuit comprising:
  respective means for each transducer for feeding an alternating input signal thereto;
  common means for receiving the signals thereby produced from the transducers; and
  respective means for each transducer for receiving the output signal from said common means and demodulating the received signal synchronously with the frequency of the respective input signal to that transducer;
  wherein the frequencies of said input signals are even harmonics or sub-harmonics of each other.

As noted above, a known capacitive displacement transducer may comprise three or more plates, arranged as a differential pair of capacitors. Thus, a two axis device normally requires six capacitor plates, and because of the requirements for relative movement of the plates on two separate axes, it follows that each of the six plates forms a separate sub-assembly of the device. In the case of a three axis device, the situation is even worse because nine capacitor plates are required, each forming an individual sub-assembly. Construction of the device is therefore complicated and relatively expensive.

A second aspect of the present invention provides a device which is responsive to displacement in at least two axes, the device comprising a capacitive displacement transducer for each said axis, each transducer including at least two opposed capacitor electrodes, one electrode of each transducer being common with an electrode of the or each other transducer.

Preferably the capacitor electrodes of the transducers which are not common are provided on a common printed circuit board. Preferably there are two such printed circuit boards, on opposing sides of the common electrode, giving each transducer a differential arrangement in which the common central electrode is relatively movable between the two outer electrodes on the printed circuit boards.

Figure 2:
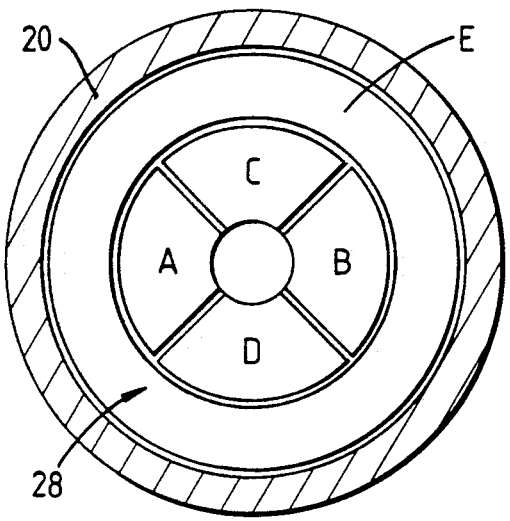
Figure 3:
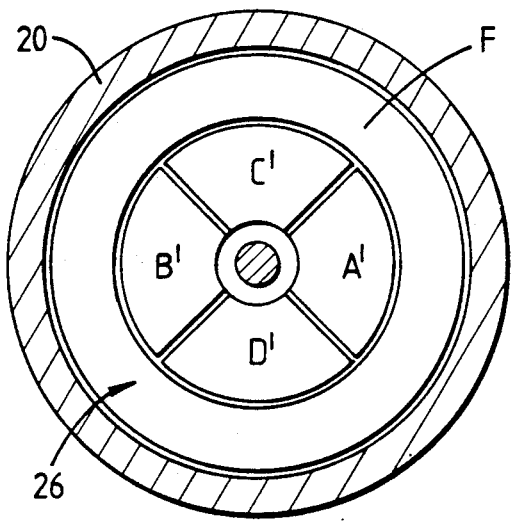
Figure 4:
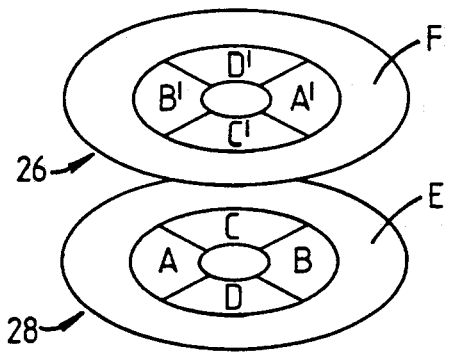
Figure 4A:
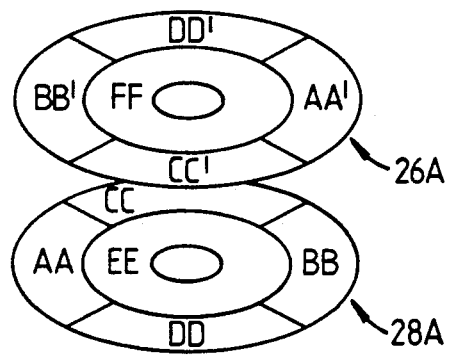
Figure 5:
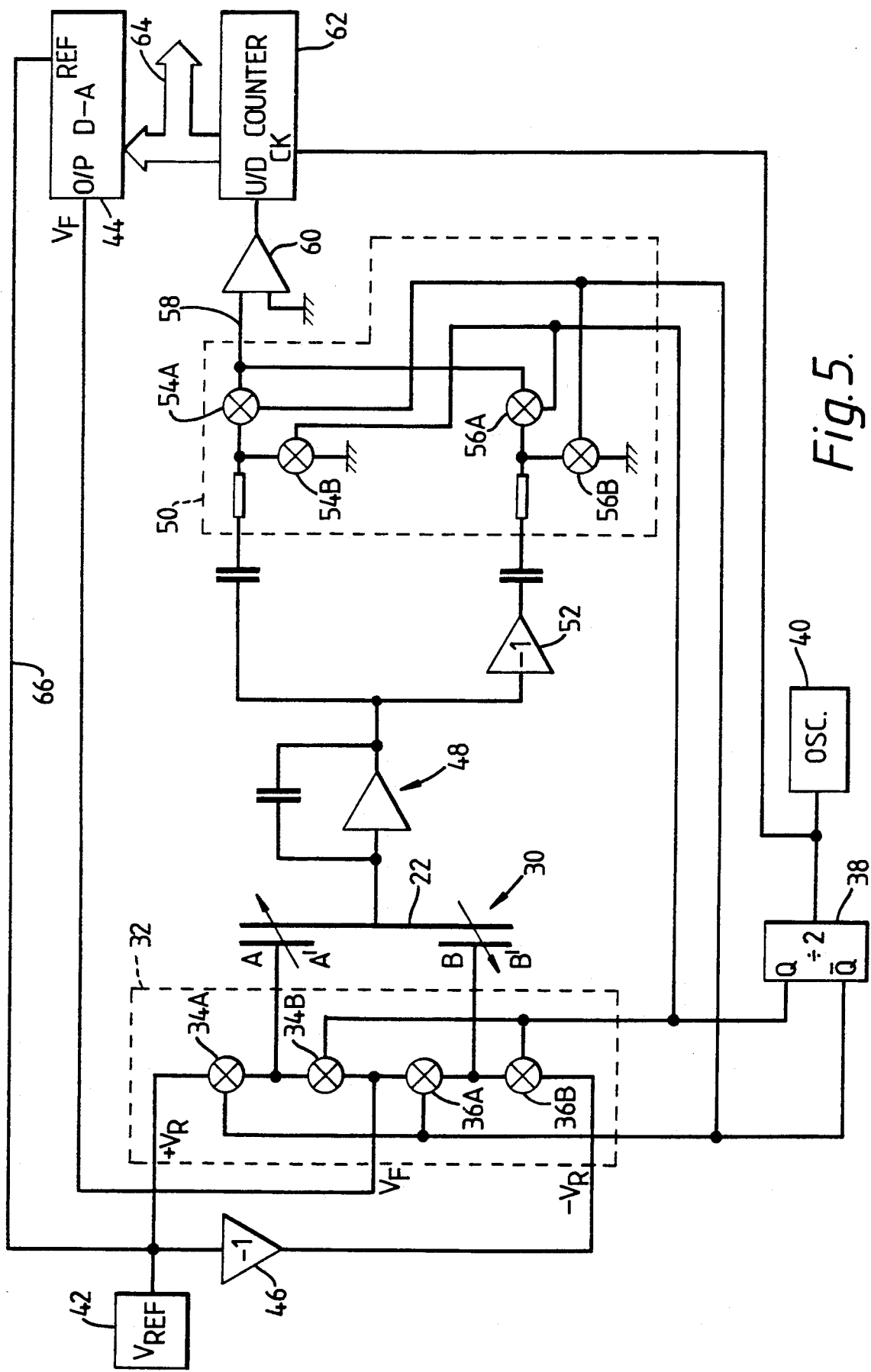
Figure 6:
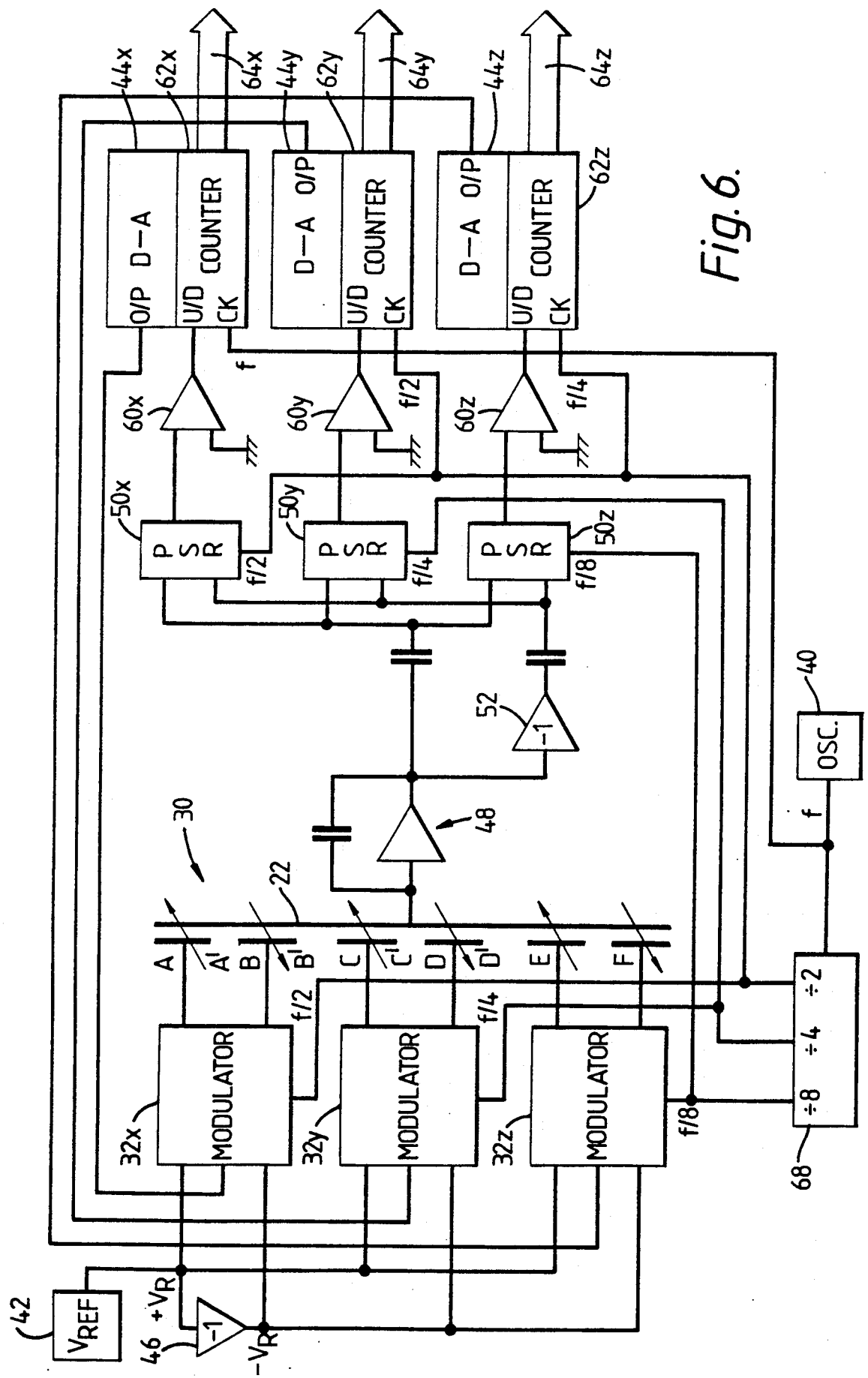
Figure 7:
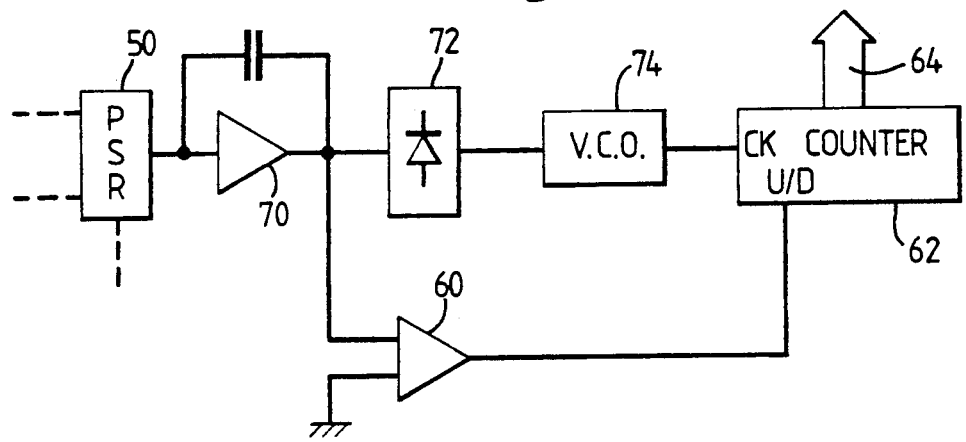

Examples which incorporate both aspects of the invention will now be described, with reference to the accompanying drawings, wherein:

FIG. 1 is a vertical section through a joystick incorporating capacitance transducers, FIGS. 2 and 3 are sections on the lines II—II and III—III respectively in FIG. 1, FIG. 4 is a diagrammatic isometric view of the arrangement of electrodes in FIGS. 1 to 3, FIG. 4A is a view corresponding to FIG. 4, but showing an alternative electrode arrangement, FIG. 5 is a circuit diagram of a signal conditioning system for the transducers for a single axis of movement of the joystick, FIG. 6 is a circuit diagram of a signal conditioning system for the transducers for three axes of movement, FIG. 7 is a partial circuit diagram showing a modification of FIG. 5 or FIG. 6, and FIGS. 8, 9, 10 and 11 are circuit diagrams of alternative signal conditioning systems.

Referring firstly to FIGS. 1 to 4, the joystick comprises a housing 10 from which projects a control lever 12. The control lever 12 is supported by a spring diaphragm 14 so as to be manually tiltable about axes x and y and translatable along an axis z. The diaphragm 14 exerts a restoring force on the control lever to return it to a null position when no external force is applied. The diaphragm is clamped between clamp rings 16, 18 which form part of the housing 10.

The control lever 12 may be provided with a conventional knob or hand grip so that it can be manipulated manually. Alternatively, the device may be constructed as a measuring probe rather than as a joystick, in which case the lever 12 functions as a stylus and would have a conventional stylus tip for contacting a workpiece.

Within the housing 10, a metal disc-shaped plate 22 is fastened to the bottom end of the control lever 12, via an insulating block 24. The plate 22 is therefore tiltable in the x and y directions and translatable along the z axis by means of the control lever 12.

The device comprises two printed circuit boards 26,28, one on each side of the plate 22 and generally parallel with it. The circuit boards 26,28 are spaced apart by and secured to a spacer ring 20, which forms part of the housing 10 and is clamped to the clamp rings 16,18. As shown in the drawings, both printed circuit boards are annular, though it is only necessary for the upper circuit board 26 to be annular (in order to accommodate the control lever 12). Printed on the circuit boards 26,28 are electrode patterns which form variable capacitors, in cooperation with the plate 22. Simplified versions of these patterns are shown in FIGS. 2 and 3 (and the layout is shown diagrammatically in FIG. 4) though in practice the pattern etched onto the printed circuit boards also incorporates connections to the various electrodes, and guard rings around some or all of them which are connected to earth or another constant potential. Such details are conventional and have been omitted for simplicity of description.

The lower circuit board 28 has an outer annular electrode E as part of its printed pattern, and the upper circuit board 26 has a corresponding, identical electrode F. These two electrodes E,F cooperate with the central plate 22 to form a differential capacitor, varying as the control lever 12 is moved in the ±z directions.

Inside the electrode E, the lower circuit board 28 has four quadrant-shaped electrodes A,B,C,D. The upper circuit board 26 similarly has four quadrant-shaped electrodes A',B',C',D', each of which is diametrically opposed to the respective electrode A,B,C,D. The two circuit boards are interconnected (by means not shown) such that the electrode A is electrically connected to the electrode A'. Similarly the electrodes B,C,D are respectively connected to the electrodes B',C',D'. The connected electrode pair A,A' and the connected pair B,B' form a differential capacitor with the centre plate 22, which varies as the control lever 12 tilts about the x axis. Likewise, the electrode pair C,C' and the electrode pair D,D' form another differential capacitor with the central electrode 22, which varies as the control lever 12 is tilted about the y axis.

The arrangement of electrodes just described provides a three axis capacitive transducer which needs only three electrode assemblies, namely the two circuit boards 26,28 and the central electrode plate 22. Since the central plate 22 has just one electrode, it is easily fabricated from sheet metal. All the complicated electrode shapes are provided on just the two circuit boards 26,28, and since these can be easily fabricated as conventional printed circuits they are very cheap. Furthermore, the signal conditioning circuitry (described below) can if desired be provided on an extension of one of the two circuit boards, further reducing the overall cost of the device.

If desired, the second set of quadrant-shaped electrodes A',B',C',D', may be omitted. However, the performance of the device will suffer slightly, and since little additional cost is involved in providing these electrodes, their omission is not preferred.

In FIG. 4A, there is shown an alternative electrode arrangement. Electrodes which correspond electrically to the electrodes A,A',B,B' etc. of FIG. 4 have been labelled AA,AA',BB,BB' etc. As can be seen, the arrangement is the inverse of that shown in FIG. 4, with the electrode EE being surrounded by an annulus divided up into the electrodes AA,BB,CC,DD, and with the electrode FF being surrounded by an annulus divided up into the electrodes AA',BB',CC',DD'. The electrical connections into differential capacitors are analogous to those previously described.

The signal conditioning system for the joystick will now be described. For purposes of explanation, FIG. 5 shows a single channel signal conditioning system, useful for processing signals from the transducers on a single axis. FIG. 6 shows how such a single axis circuit can be expanded to three channels for a three axis device.

Referring to FIG. 5, reference numeral 30 generally indicates a single channel transducer, consisting of the electrodes A,A', B,B' and 22, forming the differential capacitor which reacts to tilting about the x axis. Two square wave drives are applied to the fixed plates A,A' and B,B' respectively of the differential capacitor.

These two square wave drives are derived from a modulator 32 which comprises two pairs of electronic switches, 34A,34B and 36A,36B. The switch pairs are driven by phase and antiphase signals derived by a bistable 38 from a clock oscillator 40. The amplitude of the square wave applied to the electrodes A,A' by the switch pair 34A,34B is set at a reference voltage $+V_R$ generated by a reference source 42, and by a feedback voltage $V_F$ which is derived from a digital to analogue converter 44 as discussed below. In a similar fashion, the amplitude of the square wave applied to the electrodes B,B' is determined by the feedback voltage $V_F$ and by a reference voltage $-V_R$, produced by an inverter 46 which inverts the output of the reference source 42.

The resulting signal produced on the central electrode 22 is received by a charge amplifier 48, which detects and amplifies any imbalance in current between the two capacitances of the differential capacitor 30. The output of the charge amplifier 48 is taken to one input of a phase sensitive rectifier (PSR) 50, which acts as a synchronous demodulator. Another input of the PSR 50 receives an inverted version of the output of the charge amplifier 48, produced by an inverter 52.

The PSR 50 comprises two pairs of electronic switches 54A,54B and 56A,56B, which are driven by the same phase and antiphase signals as the modulator 32, derived from the bistable 38. The PSR 50 produces an output on a line 58, the next DC value of which is indicative of any current imbalance between the two capacitances of the transducer 30.

A current comparator 60 receives this output on line 58, and controls the up/down input of an up/down counter 62 according to whether the current on line 58 is positive or negative. The counter 62 is clocked by the output of the clock oscillator 40, and will count up or down one count on each clock pulse (that is on each half cycle of the square waves driving the modulator 32 and PSR 50).

The counter 62 produces a digital output 64, which is used as the output of the signal conditioning system, and which also feeds the digital to analogue converter 44 to produce the feedback voltage $V_F$. Thus, the feedback voltage $V_F$ reacts to any current imbalance in the differential capacitor 30 in the sense which tends to reduce that imbalance to zero. It follows that the digital output 64 is then an indication of the position of the centre electrode 22 relative to the two fixed electrode pairs A,A' and B,B'. It will be seen that, in effect, the comparator 60 and counter 62 act to integrate the output of the PSR 50.

To be more exact, the digital output is proportional to $(C1-C2)/(C1+C2)$, where C1 and C2 are the capacitances of the two halves of the differential capacitor. This ratio is linearly proportional to the displacement of the electrode 22.

To give ratiometric operation, the digital to analogue converter 44 has its reference input supplied by a line 66 from the voltage reference source 42.

If desired, the signal $V_F$ can be used as an alternative, analogue output in place of or as well as the digital output 64.

In the multi-channel system of FIG. 6, use is made of the property of phase sensitive rectifiers that they have no net DC output from signals which are even harmonics or even sub-harmonics of the carrier. This allows a system to be built in which the signals of the three separate channels are in effect multiplexed through a single charge amplifier 48 from the single centre electrode 22 of the transducer. The advantages of this are firstly that it allows the use of a simple metal plate for the central electrode 22, and secondly that it requires only the one charge amplifier 48. The significance of the latter point lies in the fact that such a charge amplifier is often an expensive component, so that expense is once again reduced.

Referring to FIG. 6, the same reference numbers and letters have been used as previously, with the addition of suffixes x,y or z where appropriate to denote components which are duplicated in each of the x,y and z channels. Thus, each channel has its own modulator 32x,32y, 32z, its own PSR 50x,50y,50z, its own comparator 60x,60y,60z, its own counter 62x,62y,62z producing respective digital outputs 64x,64y,64z and its own digital to analogue converter 44x,44y,44z. Each of these components is constructed in an identical manner to FIG. 5. Additionally, the circuit has a charge amplifier 48, voltage reference source 42, corresponding inverters 52,46, and clock oscillator 40, which are common to all three channels. For simplicity, the reference line 66 to the digital to analogue converters has not been shown.

The clock oscillator 40 produces an output frequency f and this is fed to a divider 68 producing outputs of f/2, f/4 and f/8. These are respectively used as carrier signals by the modulators and PSRs of the x,y and z channels respectively. The outputs of the divider 68 are each in phase and antiphase form, as previously, but for simplicity only one of each signal f/2, f/4, f/8 has been shown leading to the modulators and PSRs. The counters 62x,62y,62z are respectively clocked by the signals f, f/2 and f/4. That is, as previously, they are clocked at twice the rate of the corresponding carrier frequency for the channel concerned. This is the maximum useful clock frequency, there being no advantage to higher frequencies. However, the counters will perform their integrating function if clocked at any frequency, subject to the proviso that if a counter's clock frequency is too low, it will have a very slow response. Accordingly, if desired, all three counters 62x,62y,62z may be clocked at the same frequency, say f/4 or at a slower frequency. This has the advantage of simplification, and also ensures that all the channels respond at the same update rate.

Each channel works in the same way as the single axis system of FIG. 5, and is independent of the other channels because the PSRs produce no net DC output from (i.e. they reject) the carriers of the other two channels. This is because the carriers are even harmonics or subharmonics of each other. It will be seen that each output is produced continuously: multiplexing of the amplifier 48 is achieved without time-sharing, which would give discontinuous outputs.

Unlike the single axis version the outputs of the PSRs 50x,50y,50z may need some low pass filtering to remove the AC content generated by the other two carriers. Suitable low pass filters can be inserted before the inputs of the comparators 60x,60y and 60z.

In the systems shown, taking the single axis system of FIG. 5 as an example, a simple comparator 60 is used to control the up/down input of the counter 62. This means that once the system is in balance, the digital output will oscillate by one count. If it is desired to remove this oscillation, the comparator 60 may be replaced by a window comparator, which has a dead band of one or more counts and two output signals to the counter 62, namely a count enable and an up/down signal. Once within the dead band, the counter would be disabled, so as not to change state with every clock pulse. Similarly, window comparators may replace the comparators 60x,60y and 60z in FIG. 6.

The circuit of FIG. 5, or each channel for FIG. 6, could be modified as shown in FIG. 7. Whereas FIGS. 5 and 6 form Class 1 servo loops, FIG. 7 shows how to modify the circuit to give a Class 2 servo loop, in which the rate of change of the feedback signal $V_F$ depends on the size of the error detected by the PSR 50.

As shown in FIG. 7, the output of the PSR 50 is buffered by an amplifier 70, to give a voltage signal. This is rectified by a rectifier 72, giving a positive voltage whose magnitude respresents the error detected by the PSR. This positive voltage controls a voltage controlled oscillator 74, which produces clock pulses for the counter 62. Thus, the counter is clocked at a rate which depends of the size of the error. The direction of counting (up or down) is governed as previously by a comparator 60, which receives the output of the amplifier 70 and determines whether it is positive or negative. The output of the counter 62 is used as previously to generate the feedback signal $V_F$ via a digital-to-analogue converter 44 (not shown in FIG. 7), and to provide the digital output 64 of the system.

Figure 8:
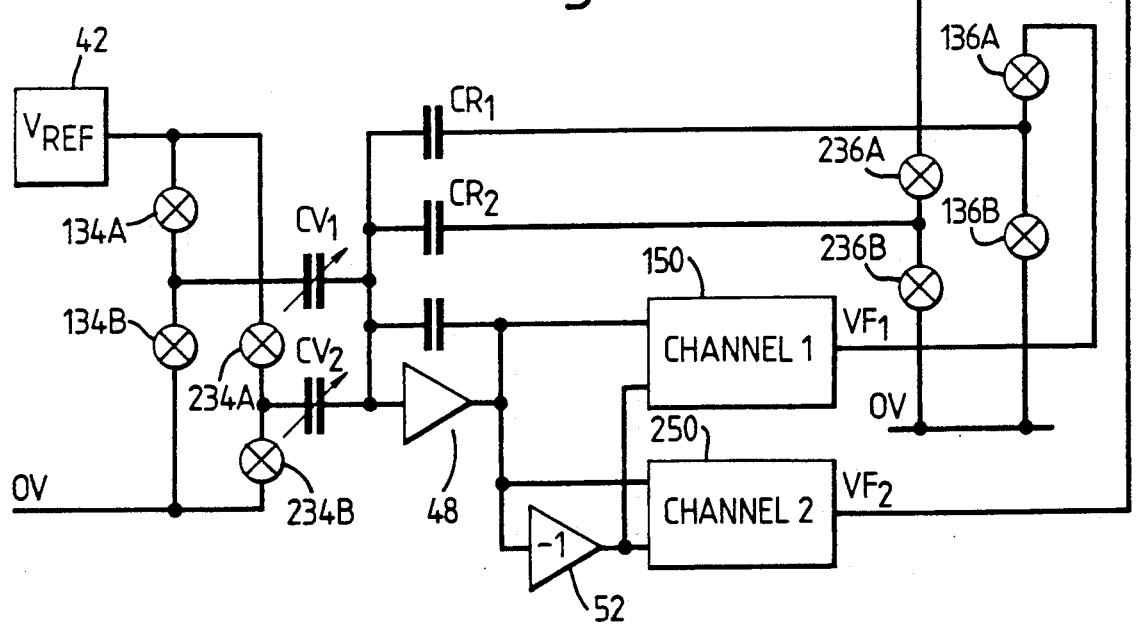

FIG. 8 shows an alternative to the circuit of FIG. 6. It is intended for use with single ended capacitive transducers, as opposed to the differential capacitive transducers of FIG. 6. The circuit effectively compares the capacitance of a capacitive transducer $CV_1$ with a fixed reference capacitance $CR_1$. Similarly, it compares a variable capacitive transducer $CV_2$ with a fixed reference capacitance $CR_2$. Thus, as shown, the circuit of FIG. 8 has two channels, but it will be appreciated that the circuit can be readily expanded to three or more channels.

In FIG. 8, the transducer $CV_1$ is fed with a square wave from a modulator comprising a pair of electronic switches 134A,134B. These are driven in phase and anti-phase so as to chop a reference voltage from a reference source 42. Similarly, the transducer $CV_2$ is supplied with a square wave from a modulator consisting of a pair of electronic switches 234A,234B. The switches 234A,234B are switched at a drive frequency which is at half the drive frequency of the switches 134A,134B, in exactly the same manner as shown in FIG. 6. Alternatively, of course, the chosen drive frequencies may be a different even multiple or sub-multiple of each other, rather than one half.

As previously, the resulting signals from the transducers $CV_1$, $CV_2$ are received by a common charge amplifier 48. The output of the amplifier 48 is taken in parallel to two sets of signal conditioning electronic circuits 150,250, one for each channel. The circuits 150,250 also receive an inverted version of the output of the amplifier 48 via an inverting amplifier 52. The circuits 150,250 each include a phase sensitive rectifier 50, a comparator 60, an up/down counter 62 and a digital-to-analogue converter 44, as described in FIGS. 5 and 6 (not shown in FIG. 8), and each produces a digital output as previously. The phase sensitive rectifier 50 in each of the circuits 150,250 is driven at the appropriate frequency corresponding to the modulator for the respective channel. That is, the phase sensitive rectifier in the circuit 150 is driven at the same frequency as the electronic switch pair 134A,134B, while that in the circuit 250 is driven at the same frequency as the electronic switch pair 234A,234B. In this way, the common output of the charge amplifier 48 is demodulated to produce a separate feedback voltage $VF_1$, $VF_2$ for each of the respective transducers $CV_1$, $CV_2$.

The feedback voltage $VF_1$ is chopped by a pair of electronic switches 136A,136B at the same frequency as the switches 134A,134B. The resulting square wave is fed back through the fixed reference capacitance $CR_1$ to the input of the charge amplifier 48. In exactly the same manner as FIGS. 5 and 6, the circuit 150 reacts to any change in the capacitance of the transducer $CV_1$ by changing the feedback voltage $VF_1$ in such a manner as to tend to null the change. This gives the effective comparison between the capacitance of the transducer $CV_1$ and the fixed reference capacitance $CR_1$ as mentioned above. The output of the circuit 150 is given by $VF_1/VR = CV_1/CR_1$, where VR is the voltage of the reference source 42.

Likewise, the feedback voltage $VF_2$ from the circuit 250 is chopped by a pair of electronic switches 236A,236B at the same frequency as the electronic switch pair 234A,234B. The resulting square wave is fed through the reference capacitor $CR_2$ to the input of the charge amplifier 48. The result is that the output of circuit 250 is given by $VF_2/VR = CV_2/CR_2$.

Of course, the digital outputs (not shown) of the circuits 150,250 mirror the analogue feedback voltages $VF_1$, $VF_2$.

Figure 9:
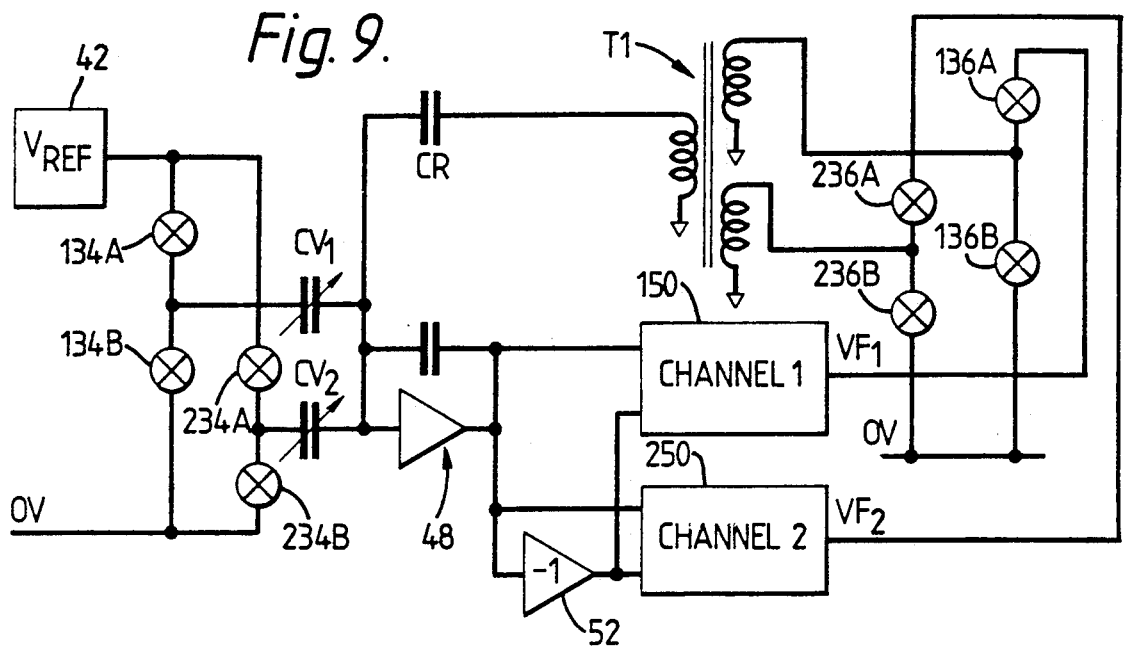

FIG. 9 shows a circuit which is similar to FIG. 8. Similar circuit components have been given the same reference numerals, and need not be described further. However, in FIG. 9, a single reference capacitor CR replaces the two separate reference capacitors $CR_1$, $CR_2$ of FIG. 8. In order that the respective chopped output voltages $VF_1$, $VF_2$ can both be fed back to the input of the amplifier 48 via this single reference capacitance, the voltage outputs of the electronic switch pairs 136A,136B and 236A,236B are added together by a transformer T1. The advantage of the FIG. 9 circuit is that the matching of the outputs of the two channels does not depend upon the matching of the two reference capacitances. Instead, it depends upon the matching of the primary coils of the transformer T1, which is more easily achieved.

The transformer T1 merely serves as a convenient voltage addition means, it being easy to ensure that the signals are accurately added together by such a device.

Figure 10:
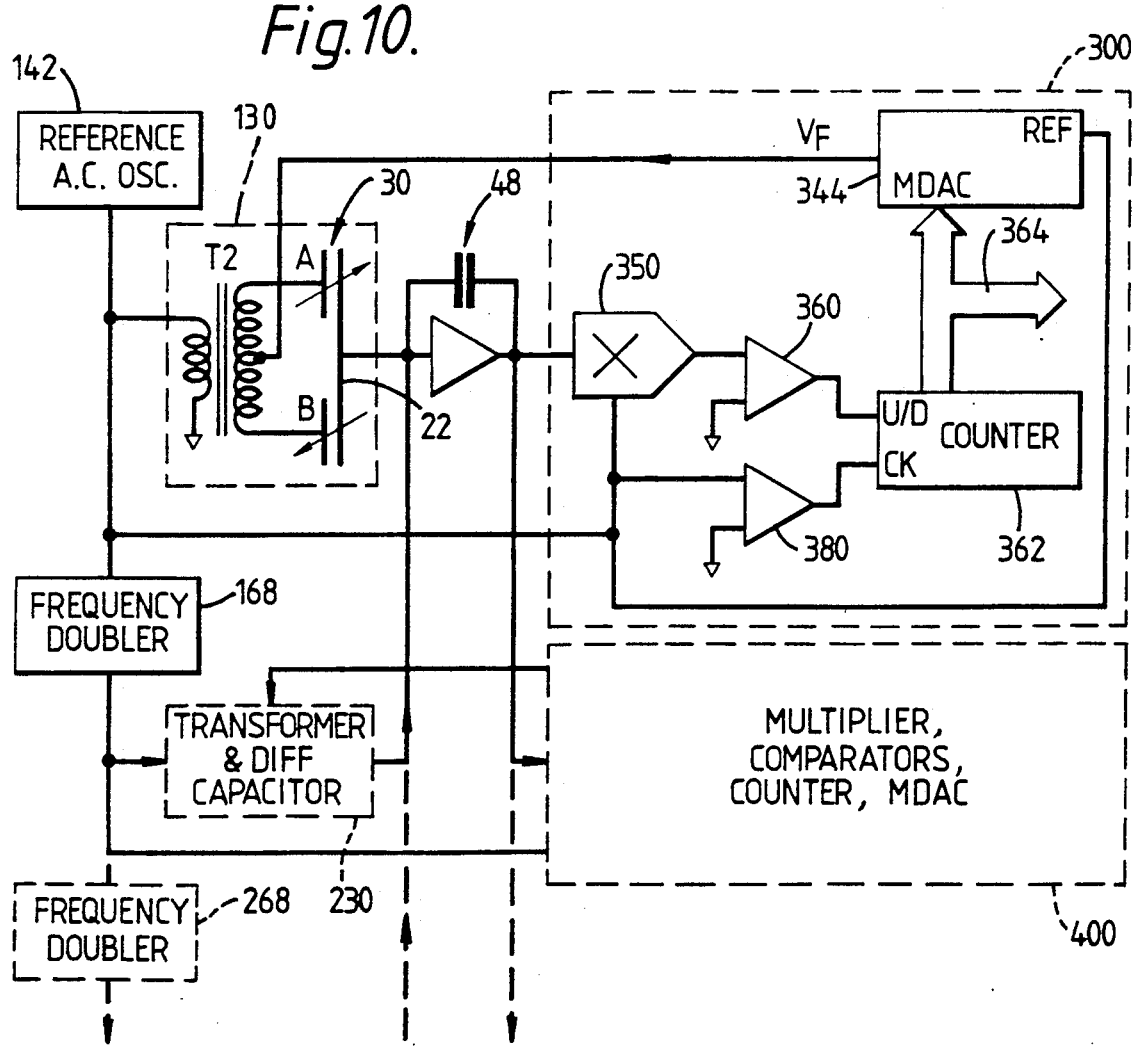
Figure 11:
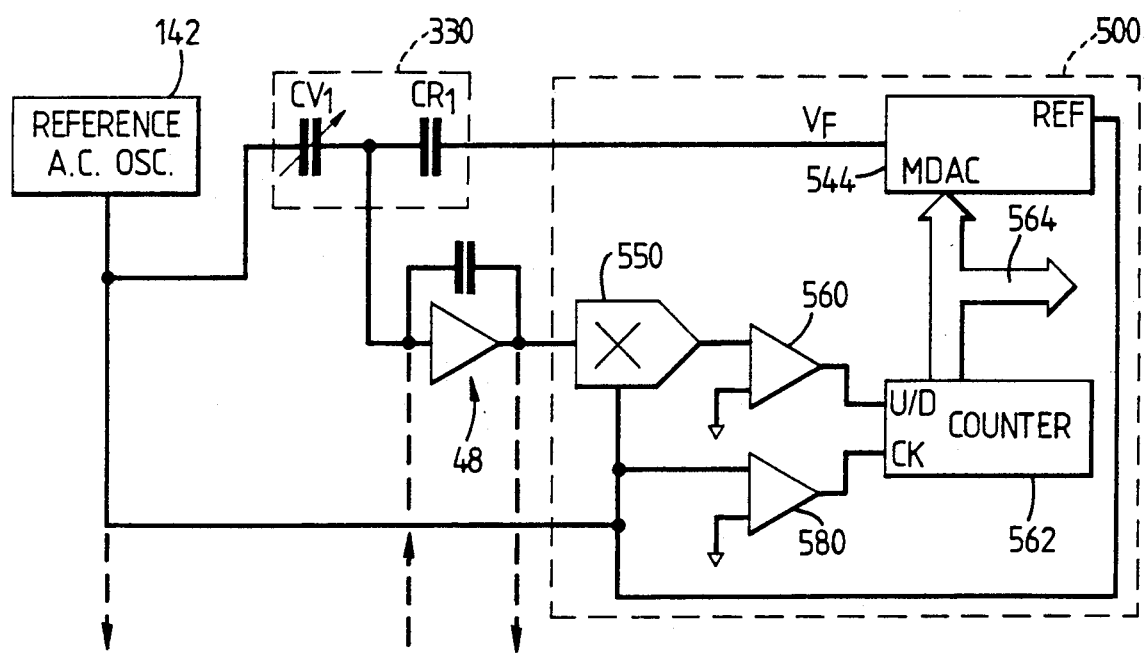

The above examples have used square wave drives for the modulators and demodulators. However, it should be appreciated that the invention is not limited to square wave drives, and may for example use drive waveforms of any other shape, such as sinusoidal or triangular. To illustrate this, FIGS. 10 and 11 show circuits with sinusoidal drives. For each of these figures, only one channel will be described in detail, since the further channels are similar.

FIG. 10 is intended for use with a differential capacitance transducer 30, having a common plate 22 and input plates A and B, as in FIGS. 5 and 6. However, in place of the modulator 32, there is provided a transformer T2. The primary of the transformer T2 is driven by a sinusoidal AC oscillator 142, the output of which has an amplitude at a reference voltage. The secondary of the transformer T2 is centre-tapped, and has its two ends connected to the plates A and B of the differential transducer 30, which are thus fed with phase and antiphase sinusoidal signals. A charge amplifier 48 receives the common output from the plate 22 of the transducer 30, summing the differential signals received from the two sides of the transducer.

The output of the charge amplifier 48 is taken to a circuit 300 which is analagous to the circuits 50, 60, 62 and 44 of FIGS. 5 and 6, but which is designed for the sinusoidal signals of the present circuit. Thus, the circuit 300 includes a phase sensitive detector in the form of a multiplier 350 which receives the output of the charge amplifier 48 and is driven by the reference sinusoidal signal from the oscillator 142. The output of the multiplier 350 is a voltage which is positive or negative, depending on the phase of the output of the amplifier 48 relative to the reference. A comparator 360 detects whether this output is positive or negative, and sets the up/down control input of an up/down counter 362 accordingly. The counter 362 is clocked at the same frequency as the reference oscillator 142, by a comparator 380 which serves to square the sinusoidal oscillation.

In the present case, the output of the counter 362 is signed, giving a digital output 364 which can be either positive or negative. This is taken to a four quadrant multiplying digital-to-analogue converter 344. This converter 344 has a reference input which receives the sinusoidal reference signal from the oscillator 142. The output of the converter 344 is a voltage signal $V_F$, which is the result of multiplying the sinusoidal reference signal by the positive or negative digital output of the counter 362. The resulting feedback signal $V_F$ is a sinusoidal signal having an amplitude depending on the digital output 364 of the counter 362, which is in phase with the reference signal if the digital output is positive, and in anti-phase if the digital output is negative. This signal $V_F$ is taken to the centre tap of the transformer T2, with the same result as in the previous circuits, namely that the circuit 300 acts to tend to null the input to the charge amplifier 48, so that the digital output 364 reflects the setting of the differential capacitance 30 which is to be measured. The output 364 is proportional to $(C_1 - C_2)/(C_1 + C_2)$, where $C_1$ and $C_2$ are the respective capacitances of the two halves of the differential capacitance transducer 30.

Thus far, only one channel of the circuit of FIG. 10 has been described. However, the circuit has the ability to multiplex the signal conditioning from several transducers 30 through a common charge amplifier 48. As shown in FIG. 10, a circuit block 130 consists of the differential transducer 30 and transformer T2 just described, and is repeated in further channels as a circuit block 230. The input to the circuit 230 is a sinusoidal reference signal derived from the oscillator 142 via a frequency doubler 168. Thus, the reference signal in the second channel is twice that of the first channel. The output from the common plate of the differential transducer in the circuit 230 is taken to the common input of the charge amplifier 48. The second channel has a circuit 400, identical to the circuit 300 of the first channel, which receives the output of the amplifier 48 and demodulates it using the reference signal from the frequency doubler 168. Thus, the second channel works in exactly the same manner as the first, but with a reference signal which is double the frequency of the first.

Likewise, if further channels are required, they can be added in identical fashion, for example using a further frequency doubler 268.

FIG. 11 shows an example which is analagous to FIG. 8, but using a sinusoidal reference signal as in FIG. 10. The circuit 130 of FIG. 10 is replaced by a circuit 330, comprising a variable capacitance transducer $CV_1$ and a fixed reference capacitance $CR_1$, similar to those of FIG. 8. A reference oscillator 142, similar to that of FIG. 10, provides a sinusoidal signal having a reference amplitude voltage, which passes through the transducer $CV_1$ to the input of a common charge amplifier 48. The output of the amplifier 48 is processed by a circuit 500. The circuit 500 contains a multiplier 550 and comparators 560 and 580, which function in exactly the same manner as FIG. 10 and will not be described further. However, the counter 562 of the circuit 500, while corresponding to the counter 362, does not have a signed digital output, but instead has a digital output 564 which is always positive. This is multiplied by the sinusoidal reference signal in a multiplying digital-to-analogue converter 544. The converter 544 corresponds to the converter 344, but need only be a two quadrant multiplier, because the digital input 564 is always positive. The resulting sinusoidal output signal $V_F$ is fed back to the charge amplifier 48 via the reference capacitance $CR_1$, so as to act in a similar manner to the circuit of FIG. 8. The output 564 is proportional to $CV_1/CR_1$, as in FIGS. 8 and 9.

The circuits 330 and 500 are of course duplicated for other channels, which are driven at even multiples of the frequency of the reference oscillator 142 via frequency doublers, exactly as in FIG. 10.

In the single ended circuits described (FIGS. 8, 9 and 11) the accuracy can be improved by fabricating the reference capacitances in the same manner as the variable transducer capacitances. This ensures that such factors as variances in the dielectric constant, manufacturing tolerances, etc, affect both the variable capacitances and the reference capacitances equally, and therefore cancel out.

The above examples of the invention have related to joysticks. However, the electrode arrangements and signal conditioning circuits described can each also be used in measuring probes, separately or together. Moreover, they are not limited to use in devices for detecting displacement, and may be used in any other sensors in which such transducers are used, e.g. pressure sensors.

I claim:

1. A circuit for providing outputs from at least two capacitive transducers, the circuit comprising:
   respective means for each transducer for feeding an alternating input signal thereto;
   common means for receiving the signals thereby produced from the transducers; and
   respective means for each transducer for receiving the output signal from said common means and demodulating the received signal synchronously with the frequency of the respective input signal to that transducer;
   wherein the frequencies of said input signals are different from each other.

2. A circuit according to claim 1, wherein each receiving and demodulating means provides a feedback signal, which is fed back to said common means via a reference capacitance, the feedback signal acting so as to tend to cancel the signal received by said common means from the respective transducer, whereby the magnitude of the feedback signal indicates the output of the respective transducer.

3. A circuit according to claim 1, wherein each transducer comprises a differential pair of capacitances.

4. A circuit according to claim 3, wherein each receiving and demodulating means provides a feedback signal, which is fed back to the respective transducer, the feedback signal acting so as to tend to cancel the signal received by said common means from the respective transducer, whereby the magnitude of the feedback signal indicates the output of the respective transducer.

5. A circuit according to claim 1, wherein each said receiving and demodulating means includes means for integrating the demodulated signal.

6. A circuit according to claim 5, wherein the integrating means includes a counter which provides a digital output which indicates the output of the respective transducer.

7. A circuit according to claim 1, in combination with a device which is responsive to displacement in at least two axes, the device comprising a respective said capacitive transducer responsive to displacement in each said axis, said circuit being connected to said transducers in order to provide outputs indicating the displacements in said axes.

8. A circuit according to claim 1, wherein the frequencies of said input signals are even harmonics or subharmonics of each other.

9. A device which is responsive to displacement in at least two axes, the device comprising a differential capacitive displacement transducer for each said axis,
   each transducer including at least two opposed outer capacitor electrodes, and a central electrode which is relatively movable in said at least two axes between the two outer electrodes,
   the central electrode of each transducer being common with the central electrode of the or each other transducer.

10. A device according to claim 9, wherein at least some of the outer electrodes of the transducers are provided on a common printed circuit board.

11. A device according to claim 10, wherein there are two said printed circuit boards, on opposing sides of the central electrode.

12. A device according to claim 9, wherein at least one said transducer has two further opposed capacitor electrodes, said two further electrodes each being electrically connected to a respective one of said outer electrodes so as to form part of a respective composite electrode.

* * * * *